(12) United States Patent
Yamin

(10) Patent No.: US 8,973,205 B2
(45) Date of Patent: Mar. 10, 2015

(54) BRUSH ASSEMBLY

(71) Applicant: Theodore Yamin, Imlay City, MI (US)

(72) Inventor: Theodore Yamin, Imlay City, MI (US)

(*) Notice: Subject to any disclaimer, the term of this patent is extended or adjusted under 35 U.S.C. 154(b) by 83 days.

(21) Appl. No.: 13/890,326

(22) Filed: May 9, 2013

(65) Prior Publication Data

US 2014/0331420 A1    Nov. 13, 2014

(51) Int. Cl.
*B60S 3/06* (2006.01)
*A46B 7/10* (2006.01)

(52) U.S. Cl.
CPC .. *B60S 3/066* (2013.01); *A46B 7/10* (2013.01)
USPC .......................................... 15/230.16; 15/179

(58) Field of Classification Search
CPC ............. B08B 1/04; B60S 3/06; B60S 3/063; B60S 3/066; A46B 2200/3046; A46B 13/00
USPC ........... 15/230, 230.16, 230.12, 230.15, 179, 15/181, 183, 97.3, 53.1–53.3
See application file for complete search history.

(56) References Cited

U.S. PATENT DOCUMENTS

| 4,018,014 A | * | 4/1977 | Belanger | 451/469 |
| 4,217,737 A | * | 8/1980 | Hasegawa | 451/469 |
| 4,377,878 A | * | 3/1983 | Pecora | 15/97.3 |
| 5,396,680 A | * | 3/1995 | Belanger | 15/230.16 |
| 5,400,458 A | * | 3/1995 | Rambosek | 15/179 |

* cited by examiner

*Primary Examiner* — Laura C Guidotti
(74) *Attorney, Agent, or Firm* — Gifford, Krass, Sprinkle, Anderson & Citkowski, P.C.

(57) ABSTRACT

A brush assembly for an automotive car wash having a drum adapted to be rotatably driven about an axis. The drum includes a plurality of elongated and circumferentially spaced cylindrical channels around the outer periphery of the drum and each channel includes an elongated slot open radially outwardly from the drum. An annular and cylindrical bearing sleeve is positioned within each cylindrical chamber while a brush has a retainer with a cylindrical boss along one edge which is then slidably inserted within the retainer thus securing the brush to the drum.

12 Claims, 1 Drawing Sheet

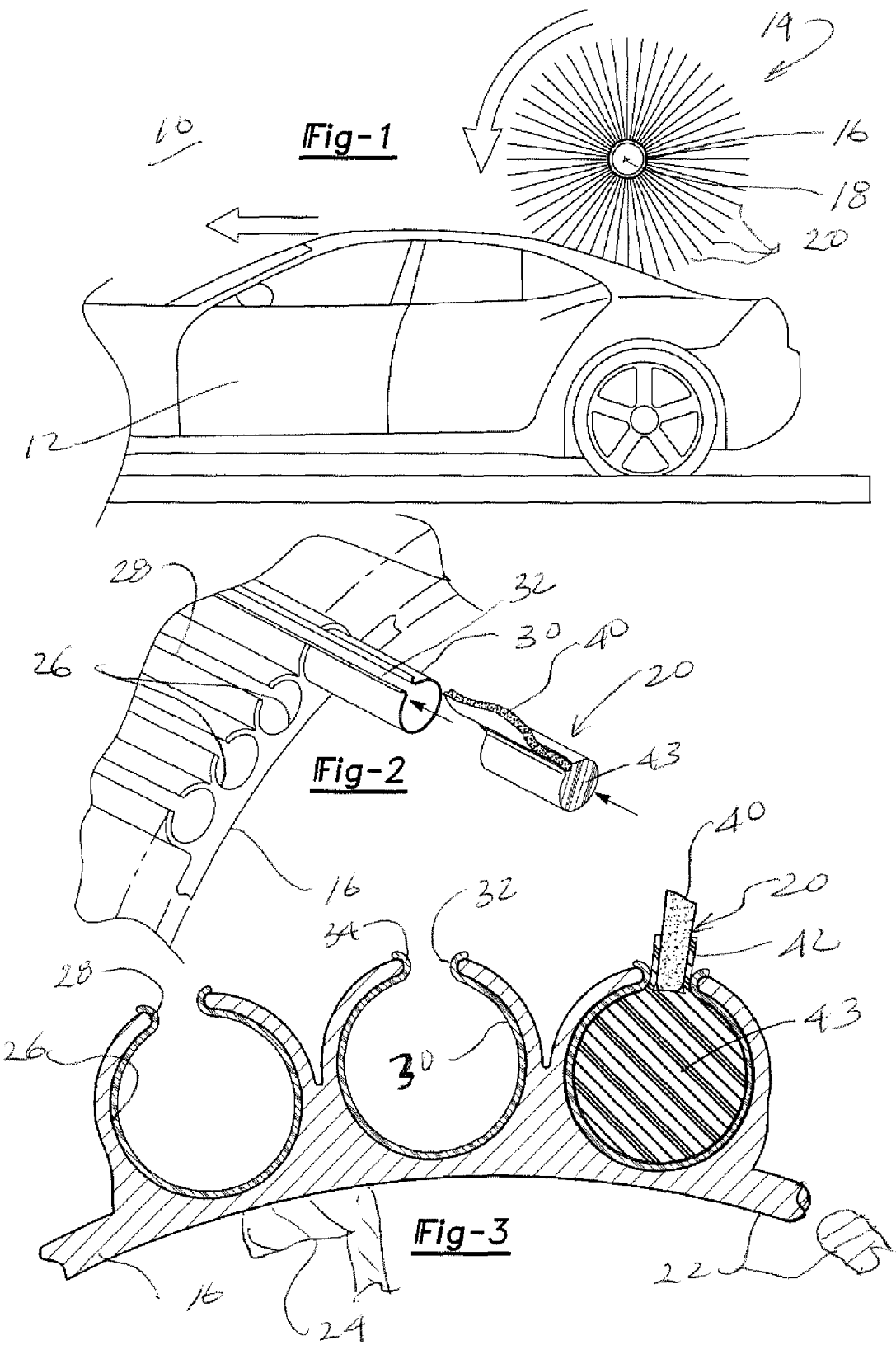

BRUSH ASSEMBLY

BACKGROUND OF THE INVENTION

I. Field of the Invention

The present invention relates generally to brush assemblies and, more particularly, to a brush assembly for a brush of the type used in an automotive car wash.

II. Description of Related Art

There are many automotive car washes throughout the country. Many, if not all, of these car washes utilize one or more cylindrical brushes which are rotatably driven against the vehicle in order to clean the vehicle of dirt and debris.

These previously known cylindrical brushes typically comprise a cylindrical drum which may, itself, be constructed from several segments which are then secured to a hub. The hub is then rotatably driven thus rotatably driving the drum about its axis.

These previously known drums further include a plurality of circumferentially spaced channels formed along the outer periphery of the drum. Each channel is generally cylindrical in cross-sectional shape and includes an elongated slot extending along its length.

A brush segment is then secured to each of the drum channels so that the brush segments, together with the drum, form the brush assembly. Each brush segment, furthermore, includes a cloth or synthetic material and is then attached to a retainer having a cylindrical section which is slidably received within the cylindrical channel on drums. The retainer thus allows the brush segments to pivot somewhat within their respective drum channels and still secure and retain the brush segments to the drum.

The previously known brush assemblies thus allow the brush segments to be replaced individually as required or, to eventually replace all the brush segments in accordance with a maintenance schedule. Such brush segments do become worn out and fray after extended use.

One disadvantage of these previously known brush assemblies, however, is that the slight pivoting of the brush segment retainers within their individual drum channels abrades away portions of the drum during extended use. This is particularly true when the drum is constructed of a relatively soft material, such as aluminum, and grit or other debris becomes entrapped between the brush segment retainer and its associated drum channel.

After prolonged use, the drum channels become so abraded and distorted that it is necessary to replace the entire drum. Replacement of the drum, however, is not only expensive, but also time consuming and results in extensive downtime for the car wash.

SUMMARY OF THE PRESENT INVENTION

The present invention provides a brush assembly especially designed for use in a car wash or similar facility which overcomes the above-mentioned disadvantages of the previously known brush assemblies.

In brief, the brush assembly of the present invention, like the previously known brush assemblies, includes a drum adapted to be rotatably driven about its axis. This drum is typically constructed of a lightweight, but strong, material, such as aluminum, and may be constructed in several segments which are secured to a hub to form the drum.

A plurality of elongated, axially extending and circumferentially spaced cylindrical channels are formed around the outer periphery of the drum. Each channel includes an elongated and radially outwardly facing slot which is open to the channel.

Unlike the previously known drums, a generally cylindrical and annular sleeve is positioned within each of the drum channels so that the outer periphery of the sleeve flatly abuts against the inner periphery of the drum channel. Each sleeve also includes a longitudinally extending slot which registers with the channel slot on the drum. In addition, each sleeve has curved edges which abut against the drum around the drum slot to hold the sleeve against rotation relative to the drum.

A brush segment is then attached to each of the channels. Each drum segment includes a fabric or synthetic portion having a retainer secured along one edge. This retainer includes a cylindrical portion which is substantially the same size as the inside diameter of the sleeve. Consequently, each brush segment is attached to the drum by sliding the cylindrical portion of the retainer into the sleeve and its associated drum channel.

In practice, some pivotal movement is permitted between each brush segment and its associated sleeve and drum channel during the operation of the brush assembly. However, in the event that grit, debris, or the like becomes entrapped between the retainer and the sleeve, the abrading action of the retainer will abrade away the sleeve, rather than the drum. The sleeve, however, may be rapidly and inexpensively replaced versus the much more expensive replacement of the drum.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a side view illustrating a portion of a car wash with the brush assembly of the present invention;

FIG. 2 is a fragmentary explosive elevational view illustrating the present invention; and FIG. 3 is a sectional view of a portion of the drum of the brush assembly of the present invention and enlarged for clarity.

DETAILED DESCRIPTION OF A PREFERRED EMBODIMENT OF THE PRESENT INVENTION

With reference first to FIG. 1, a portion of a car wash 10 is illustrated in the process of washing a car 12. The car wash includes a plurality of brush assemblies 14 (only one demonstrated) for cleaning the car 12.

The brush assembly 14 includes an elongated and generally cylindrical drum 16 that is rotatably driven about its axis 18. A plurality of brush segments 20 are secured to the drum 16 so that the brush segments 20 are circumferentially spaced from each other. These brush segments 20, furthermore, may be constructed of flexible cloth, a synthetic material, and/or the like.

With reference now to FIGS. 2 and 3, the brush drum 16 is preferably cylindrical and angular in shape. Preferably, the drum 16 is constructed from a plurality of different drum segments 22 (FIG. 3) and these drum segments 22 are then attached to a hub 24 in any conventional fashion, such as by bolting. The hub 24 is then rotatably driven in order to drive the brush assembly 14.

The hub 16 is constructed of a rigid and lightweight material, such as aluminum. Furthermore, the hub includes a plurality of circumferentially spaced and axially extending channels 26 formed about its outer periphery. Each channel 26 is cylindrical in cross-sectional shape and includes a radially outwardly facing elongated slot 28. The slot 28 preferably extends substantially the entire length of the channel 26.

An elongated annular sleeve 30 having an outside diameter substantially the same as the inside diameter of the drum channel 26 is then slidably positioned within each of the channels 26. In doing so and as thus shown in FIG. 3, the outer diameter of the sleeve 30 flatly abuts against the inside diameter of the drum channel 26.

The sleeve 30 also includes an elongated and axially extending slot 32 along its length which registers with the slot 28 in the drum channel 26 and an outwardly flared edge 34 on each side of its slot 32. This outwardly flared edge 34 of the sleeve both conforms in shape to and abuts against the edges of the channel slot 26 on the drum 16. Consequently, the outwardly flared edges 34 of the sleeve 30 lock the sleeve 30 to the drum 16 against rotation.

One brush segment 20 is then secured to each channel 26 on the drum. Each brush segment 20 includes an outwardly extending fabric segment 40 attached to a retainer 42 with a cylindrical boss 43 formed along one edge. This boss 43, furthermore, has an outside diameter substantially the same as the inside diameter of the sleeve 30. As such, the boss 43 is axially slidably received within the sleeve 30 of its associated drum channel 26 so that, upon doing so, the fabric segment 40 of the brush 20 extends radially outwardly from the drum 16.

Both the sleeve 30 and retainer 42 are preferably constructed of a synthetic material such as plastic. Furthermore, both the retainer 42 with its boss 43 are of a one-piece construction and the sleeve 30 is also of a one-piece construction.

The width of the slot formed through the sleeve 30 is substantially less than the diameter of the retainer boss 43 so that, with the retainer boss 43 positioned within its associated sleeve 30 and drum channel 26, the retainer 42 is firmly and securely attached to the drum 16. Any conventional means, such as stitching, may be used to secure the fabric segment 40 to its associated retainer 42.

In practice, the retainer 42 pivots slightly within its associated sleeve 30. However, any debris, grit or other contamination within the car wash may become entrapped between the retainer 42 and its associated sleeve 30. When this happens, pivotal movement of the retainer 42 causes the retainer 42, sleeve 30, or both to abrade away after extended use. When this occurs, it is necessary to replace the brush segments 20 as well as the sleeves 30. However, since the sleeves 30 protect the more expensive drum 16, no replacement of the drum 16 is required.

From the foregoing, it can be seen that the present invention provides a simple yet effective brush assembly which is particularly suitable for use in a car wash. Having described my invention, however, many modifications thereto will become apparent to those skilled in the art to which it pertains without deviation from the spirit of the invention as defined by the scope of the appended claims.

I claim:

1. A brush assembly comprising:
   a drum adapted to be rotatably driven about an axis,
   said drum having a plurality of elongated and circumferentially spaced cylindrical channels formed around an outer periphery of said drum, each channel having an axis parallel to said drum axis and a radially outwardly facing slot, said slot having a width less than an inside diameter of said channel,
   an annular and cylindrical sleeve positioned in each channel, each sleeve having a slot which registers with said channel slot,
   a brush segment having a retainer with a cylindrical boss attached along one edge, said boss of said retainer dimensioned to be slidably received in said sleeve.

2. The brush assembly as defined in claim 1 wherein said sleeve has an outer diameter substantially the same as said inner diameter of said channel.

3. The brush assembly as defined in claim 2 wherein said retainer has an outside diameter substantially the same as an inside diameter of said sleeve.

4. The brush assembly as defined in claim 1 wherein said sleeve comprises a synthetic material.

5. The brush assembly as defined in claim 4 wherein said sleeve comprises a plastic material.

6. The brush assembly as defined in claim 1 wherein said retainer comprises a synthetic material.

7. The brush assembly as defined in claim 6 wherein said retainer comprises a plastic material.

8. The brush assembly as defined in claim 1 wherein said sleeve is a one piece construction.

9. The brush assembly as defined in claim 1 wherein said sleeve comprises an outwardly flared edge on at least one side of said sleeve slot.

10. The brush assembly as defined in claim 9 wherein said sleeve comprises an outwardly flared edge on both sides of said sleeve slot.

11. The brush assembly as defined in claim 10 wherein said flared edges of said sleeve are complementary in shape to and abut against the sides of the channel.

12. The brush assembly as defined in claim 1 wherein said brush comprises a fabric sheet.

\* \* \* \* \*